T. HALL.
VALVE CAGE FOR OSCILLATING VALVES.
APPLICATION FILED FEB. 11, 1911.

1,006,748.

Patented Oct. 24, 1911.

Witnesses
Victor E. Jullien
M. S. Belden.

Inventor
Thomas Hall
by James W. See
Attorney

UNITED STATES PATENT OFFICE.

THOMAS HALL, OF RIDGWAY, PENNSYLVANIA, ASSIGNOR TO RIDGWAY DYNAMO & ENGINE COMPANY, OF RIDGWAY, PENNSYLVANIA.

VALVE-CAGE FOR OSCILLATING VALVES.

1,006,748.    Specification of Letters Patent.    Patented Oct. 24, 1911.

Application filed February 11, 1911. Serial No. 608,116.

*To all whom it may concern:*

Be it known that I, THOMAS HALL, a subject of the King of Great Britain, residing at Ridgway, Elk county, Pennsylvania, have invented certain new and useful Improvements in Valve-Cages for Oscillating Valves, of which the following is a specification.

In steam engines with oscillating valves it is common to bore the valve seats directly in the cylinder casting, but it is not unusual to bore the cylinder casting considerably larger than the valve-seat and to insert a ported bushing, or so-called cage, tightly in such bore to form the valve seat. The employment of inserted cages permits of the forming of the valve seats of a metal having better wearing qualities than that of the main cylinder casting. In many valve constructions the longitudinal bridge between the ports of the cage is so narrow that, notwithstanding careful and tight fitting of the cage in the bore in which it is seated, leakage frequently takes place across the outside of the bridge. This leakage is difficult to detect, and still more difficult to obviate when it is detected.

My invention is designed to overcome the evil referred to, and the invention will be readily understood from the following description taken in connection with the accompanying drawing in which:—

Figure 2:
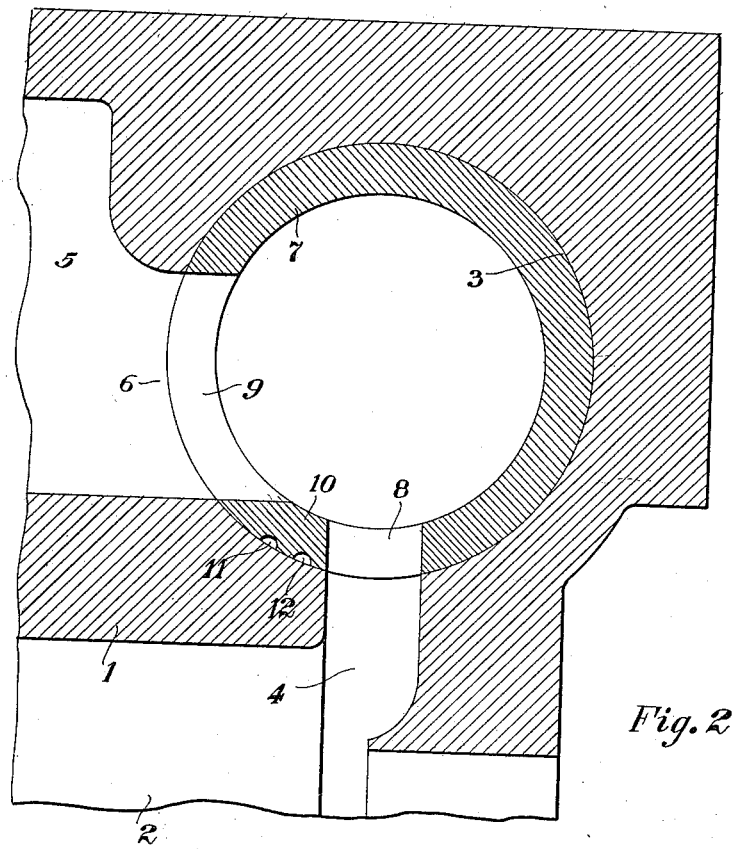
Figure 1:
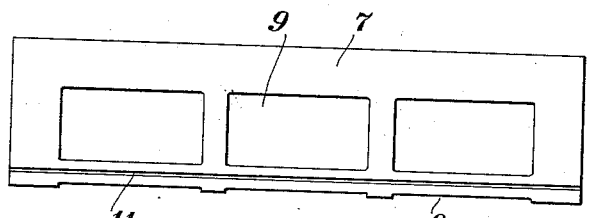

Figure 1 is a side elevation of a valve cage embodying my invention; and Fig. 2 is a vertical transverse section of the same in connection with the cylinder-portion in which it is seated. Fig. 1 is upon a much reduced scale, as compared with Fig. 2.

In the drawing:—1, indicates a portion of the engine cylinder; 2, the cylinder-bore; 3, the bore across the cylinder-casting for the cage of one of the steam valves; 4, the port leading from the valve-seat to the cylinder; 5, the steam supply passage; 6, the port leading from the steam supply passage to the valve-seat; 7, the cage, tightly fitted into the bore 3 of the cylinder casting, the bore of the cage forming the valve seat; 8, the port leading through the cage and registering with cylinder port 4; 9, the port leading through the cage and registering with supply-port 6; 10, the bridge extending longitudinally of the cage and separating ports 8 and 9; 11, a longitudinal groove disposed in the outer surface of bridge 10 and extending the full length of the cage; and 12, a second similar groove, parallel with the first one, and disposed between groove 11 and port 8.

Leakage across the outside of the bridge tends, of course, to lead from the point of higher pressure, from port 6 in the case of the steam valve illustrated. In the case of the exhaust valves the leakage would be from the engine cylinder. As the leakage in question at the exhaust valve is of much less importance than at the steam valves, only a steam valve seat has been illustrated. The bonnet of the valve seat being off, so as to expose the end of groove 11 and the valve being closed, leakage across the outside of the bridge will be indicated by steam leakage out of the end of groove 11. Such leakage, when thus detected, may be remedied by packing the groove. If, later on, it is suspected that there is leakage past the packing, the matter may be tested by observing if there is leakage from groove 12. Groove 12, being designed as a mere detector and not as a remedy, should be disposed between groove 11 and the lower pressure side of the bridge, between groove 11 and port 4 in the case of steam valves. There may, of course, be more of these grooves if needed so as to provide for more than one packing groove and still leave an unpacked detector-groove, or, if desired, only the single groove 11 need be provided, that single groove serving, first as a detector and second as a packing groove. The groove or grooves coöperate between the exterior of the bridge and the bore-surface on which the bridge seats and, so far as performance is concerned, it is immaterial whether the groove or grooves be in the exterior of the cage or in the surface of the bore engaged by the bridge, but the location of the groove or grooves in the exterior of the bridge better lends itself to satisfactory construction as such grooves are susceptible of being readily and economically and accurately produced, as by process of milling or planing.

It is to be observed in Fig. 1 that the ports 8 and 9 are not each continuous, being subdivided lengthwise by transverse bridges. This is usual construction.

The packing of groove 11 to remedy discovered leakage may be effected by means of small bits of a good grade of rubber mixed with white lead and linseed oil tightly tamped into the groove by means of a steel rod, or bits of lead, or lead wire, or packing cement tamped tightly in place may be employed. In practice I employ the first-mentioned method, which has been found entirely satisfactory. The groove or grooves serve, not only as a means for detecting leakage past the bridge and for remedying that leakage by means of inserted packing, but they also inherently serve, to considerable extent, in preventing leakage, the steam condensing in the grooves after the manner of the "water-packing" often employed in pistons, etc.

I claim:—

1. An engine cylinder provided with a cylinder bore to receive a valve-cage, a valve-cage tightly fitting said bore and provided with ports separated by a bridge, and a groove extending longitudinally from end to end of the cage in the joint between said bridge and that portion of the bore in which the bridge is seated.

2. An engine cylinder provided with a cylinder bore to receive a valve-cage, a valve-cage tightly fitting said bore and provided with ports separated by a bridge and a groove extending longitudinally from end to end of the cage and formed in the exterior surface of the bridge where the bridge makes contact with the bore.

THOMAS HALL.

Witnesses:
J. M. SCHRAM,
CARL A. FAY.

Copies of this patent may be obtained for five cents each, by addressing the "Commissioner of Patents, Washington, D. C."